Jan. 12, 1960 A. A. HURT 2,920,774
FERTILIZER SPREADING MACHINE
Filed March 14, 1955 4 Sheets-Sheet 1
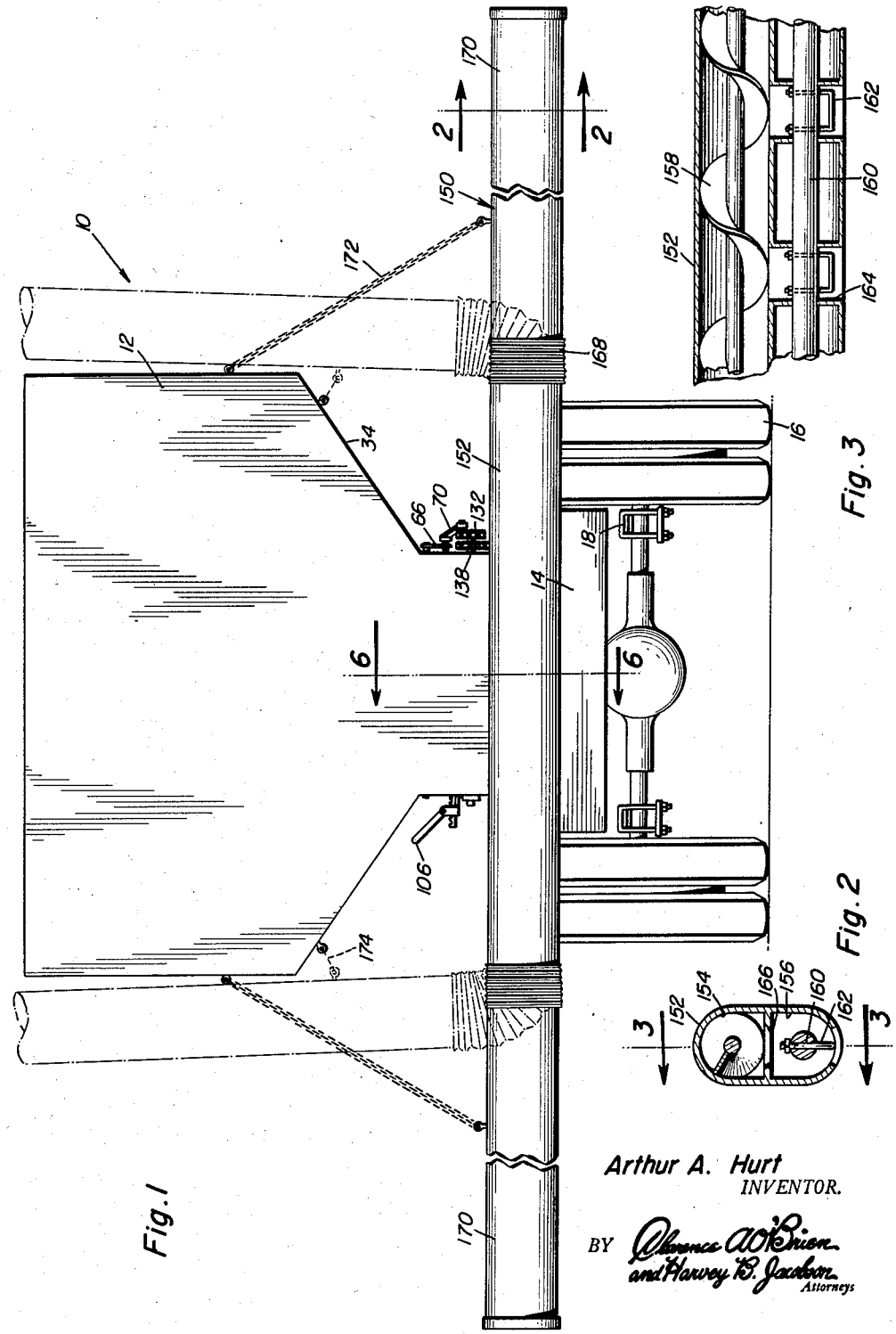
Arthur A. Hurt
INVENTOR.

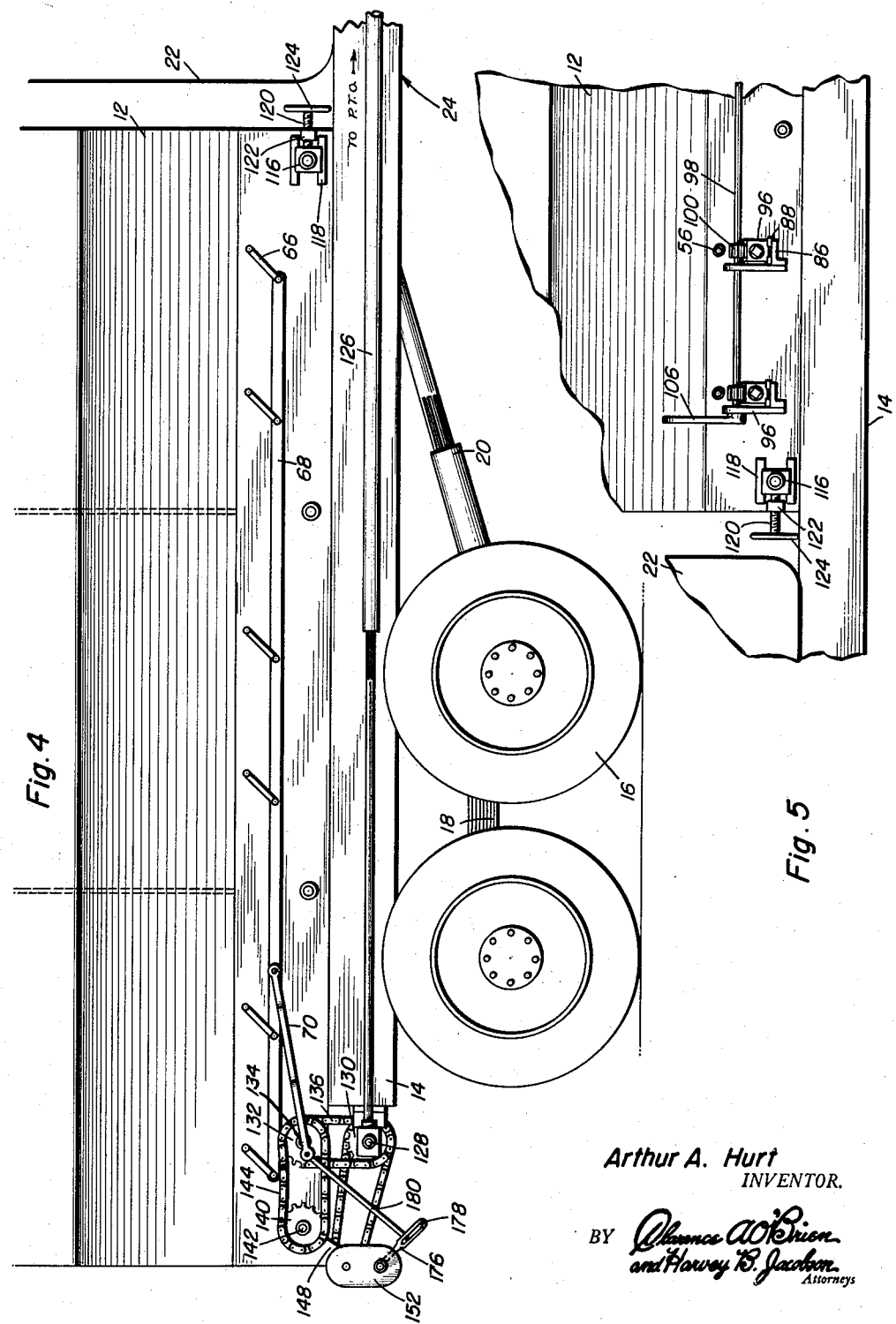

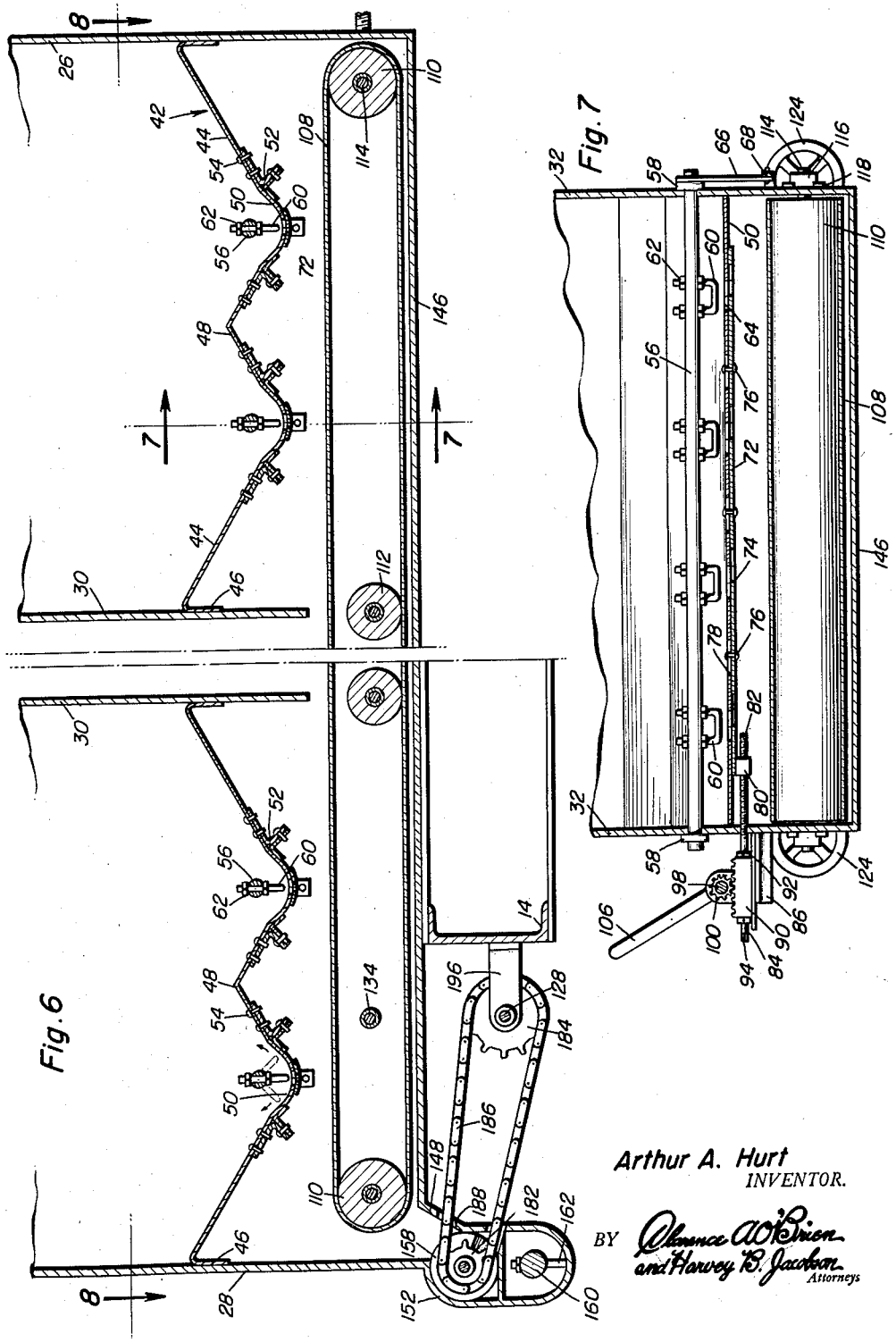

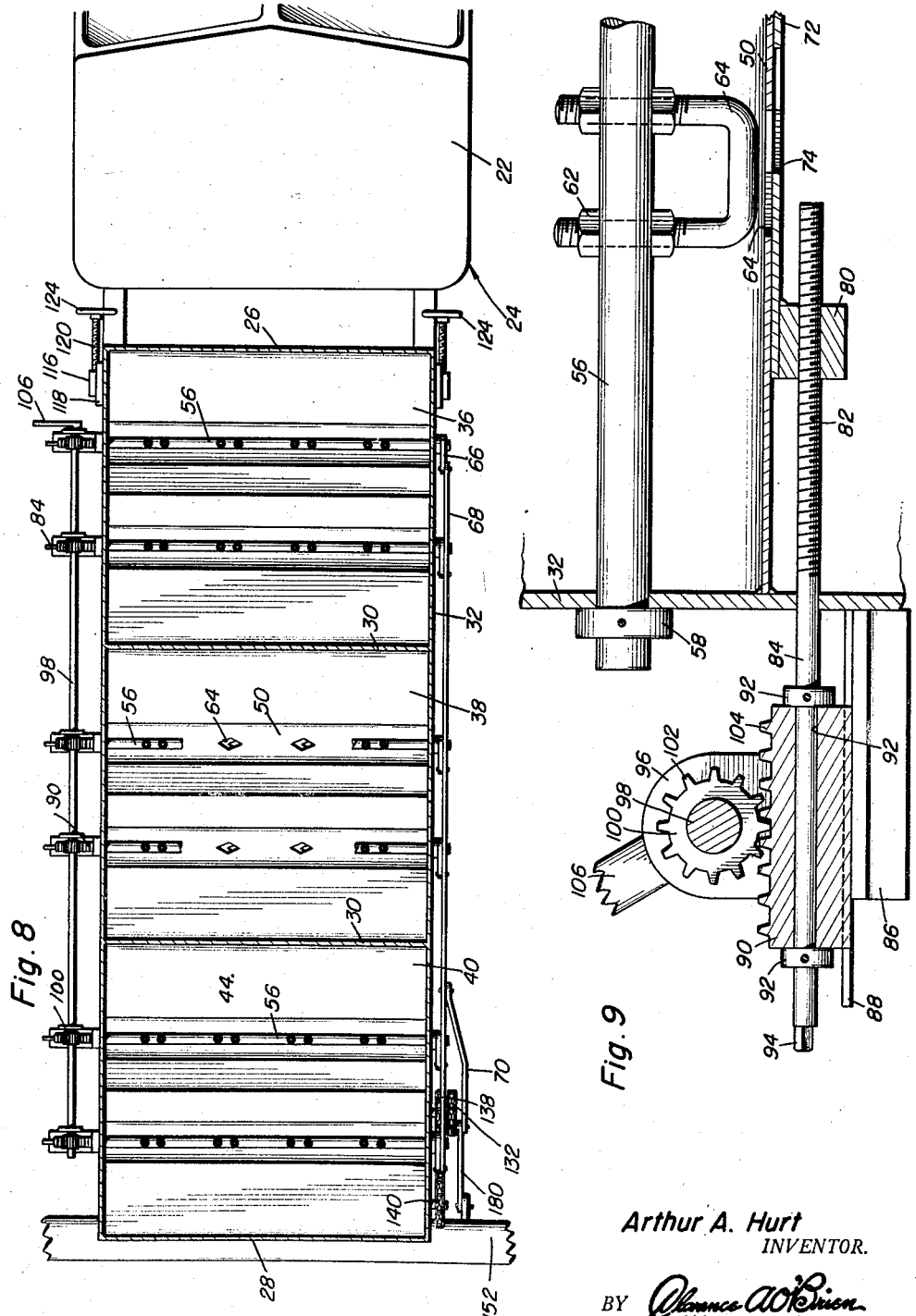

United States Patent Office
2,920,774
Patented Jan. 12, 1960

2,920,774

FERTILIZER SPREADING MACHINE

Arthur A. Hurt, Spencer, Iowa

Application March 14, 1955, Serial No. 494,044

1 Claim. (Cl. 214—83.36)

This invention generally relates to a material spreading machine, and more specifically involves improved and novel construction in a fertilizer spreading machine that embodies the provision of a compartmented receptacle for containing the ingredients normally utilized in a fertilizer mixture whereby the quantity and relative proportion of the fertilizer ingredients may be accurately controlled during the dispensing thereof.

An object of the present invention is to provide a fertilizer spreading machine that is mounted on a truck frame and powered by a suitable power take-off or the like and in which a large receptacle forms the truck body, and this receptacle is divided into at least three compartments for carrying various fertilizer ingredients so that fertilizers having a wide variation of essential elements may be provided for spreading the desired type of fertilizer on the designated area.

Another object of the present invention is to provide a fertilizer spreading machine conformable to the preceding object in which each of the compartments is provided with an oscillating agitating means therein which includes a shaft with projecting members thereon which oscillate with the shaft through an arc of substantially 90°.

A further object of the present invention is to provide a fertilizer spreading machine in conformance with the preceding objects in which a novel dispensing mechanism is provided for the compartments which may be simultaneously operated and individually adjustable for varying the discharge from each of the compartments, and yet permitting control of the discharge from a single control means.

Still another important object of the present invention is to provide a fertilizer spreading machine including an endless belt conveyor for receiving fertilizer from the various compartments and transporting fertilizer rearwardly for distribution over a relatively large area.

Still another important feature of the present invention is to provide a fertilizer spreading machine in conformance with all of the preceding objects in which a transverse screw auger conveyor receives the material from the endless belt conveyor and the screw auger conveyor including a plurality of discharge chutes having agitating means therein for spreading the material transversely of the truck frame, thereby covering a relatively large area upon each passage of the fertilizer spreading machine of the present invention.

Other important objects of the present invention will reside in its efficiency of operation, relatively simple construction, its various structural and adjustable features, its adaptation for its specific purpose, and its relatively inexpensive manufacturing and maintenance costs.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a rear end elevational view showing the fertilizer machine of the present invention mounted upon a truck frame;

Figure 2 is a transverse, vertical sectional view taken substantially upon a plane passing along section line 2—2 of Figure 1 showing the details of construction of the screw threaded auger and the agitating means in the discharge chutes of the auger;

Figure 3 is a detailed sectional view taken substantially upon a plane passing along section line 3—3 of Figure 2 showing further structural details of the spreading auger conveyor and the agitating means in the discharge chutes thereof;

Figure 4 is a side elevational view of the fertilizer spreading machine of the present invention showing the drive mechanism for the various elements thereof and showing the mechanism for imparting oscillatory motion to the agitators in each of the compartments;

Figure 5 is a fragmental side elevational view of the present invention taken from the opposite side of the fertilizer spreading machine from that of Figure 4 and showing the control means for the dispensing apparatus in each of the compartments;

Figure 6 is a vertical, sectional view taken substantially upon a plane passing along section line 6—6 of Figure 1, showing the construction and relationships of the various elements of the compartment and dispensing mechanism together with the endless belt conveyor;

Figure 7 is a vertical, sectional view taken substantially upon a plane passing along section line 7—7 of Figure 6 showing the details of construction of one of the agitating shafts and the control mechanism for dispensing;

Figure 8 is a plan sectional view taken substantially upon a plane passing along section line 8—8 of Figure 6 showing the relationships of the compartments and the agitating means together with the dispensing openings; and Figure 9 is an enlarged fragmental sectional view showing the details of construction of one of the valve plate adjusting means for controlling the dispensing from the individual compartments.

Referring now specifically to the drawings, it will be seen that the numeral 10 generally designates the fertilizer spreading machine of the present invention including an elongated receptacle 12 mounted upon an elongated vehicle frame 14 having supporting wheels 16 which drive the frame 14 together with supporting springs 18 and a drive shaft 20, all of which is conventional structure, and the frame 14 is also provided with a cab 22 in the usual manner wherein the elongated receptacle 12 actually forms the body portion of the vehicle that is generally designated by the numeral 24. Any type of vehicle may be utilized in conjunction with the present invention, although it will be understood that the present invention finds its best adaptation in conjunction with a truck vehicle 24, as illustrated.

The receptacle 12 is provided with a front wall 26 (Figure 6) and a rear wall 28 and two dividing partitions 30 that are vertically disposed between the end walls 26 and 28. While a pair of partitions 30 have been illustrated, it will be understood that more or less partitions 30 may be provided. The container or receptacle 12 is also provided with elongated side walls 32 which terminate at their lower ends in inwardly and downwardly inclined portions 34 whereby the compartments 36, 38 and 40 are provided with inwardly sloping side walls adjacent the bottom thereof.

Each of the compartments 36, 38 and 40 is provided with a bottom wall generally designated by the numeral 42 and including remote portions that are downwardly inclined and designated by the numeral 44. The outer edges of the bottom members 42 terminate in downturned flanges 46 for attachment to the end walls of the individual compartments. Disposed centrally between the inclined portions 44 is an inverted V-shaped member 48 which forms a portion of the bottom 42 and generally includes downwardly inclined surfaces in opposition to the inclined portions 44. Joining the edges of each of the downwardly inclined portions 44 to one of the edges of the inverted V-shaped member 48 is a trough-like depressed portion 50 that forms substantially a continuation of the bottom 42 and is generally curved with an upwardly facing concave portion and a downwardly facing convex portion or surface. The trough-like depressed portions 50 are secured to and rigidly retained in relation to the side walls and the members 44 and 48 by a plurality of transversely extending angle iron braces 52 together with suitable fastening means 54 securing the depressed trough-like members 50 to the portions 44 and 48 of the bottom 42.

Journaled between the side walls 32 of the compartments 36, 38 and 40 is a plurality of shaft members 56 with a shaft member 56 being disposed generally vertically above the center of the trough-like depression 50 in each of the compartments. The shafts 56 extend through the side walls 32 and collars 58 are provided for retaining the shafts 56 in correct position. Projecting through and secured to the shaft 56 is a plurality of U-bolts 60 having the free ends thereof inserted through the shaft members 56 and secured thereto by fastening nuts 62. The U-shaped members 60 generally extend radially from the shaft members 56 and are in longitudinal alignment thereon. The bight portion of the U-bolts 60 are generally disposed vertically above a plurality of apertures 64 longitudinally spaced in the depressed trough portions 50 of the bottom 42.

As illustrated in Figure 4, each of the shafts 56 is provided at one outer end with a plurality of rigidly connected links 66 that are interconnected at their outer ends by an elongated operating rod 68 which is reciprocated by a connecting rod 68 driven by a suitable mechanism to be described hereinafter to impart pivotal oscillatory motion of the shaft 56 about substantially an arc of 90°, as illustrated in Figure 6. This 90° pivotal oscillatory movement of the shaft members 56 will cause the material to be discharged through the apertures 64 in the depressed portions 50 and the concave nature of the depressed portions 50 will permit the U-shaped member to be closely received therein. Therefore, it will be seen that agitating U-shaped members 60 mounted on the oscillating rods 56 and operated by the elongated operating rod 68 will cause material to be agitated, thereby preventing possible bridging of granulated material over the discharge apertures 64.

Disposed under each of the trough-like depressed portions 50 is an elongated plate 72 of generally arcuate cross-sectional shape generally conforming to the undersurface of the depressed portions 50. The elongated plate members 72 are each provided with a plurality of spaced apertures 74 for selective alignment with the apertures 64 in the depressed portions 50 whereby the discharge from the compartments 36, 38 and 40 may be controlled by relative movement of the plate 72, thereby selectively aligning or misaligning the apertures 64 and 74, whereby the rate of flow may be controlled by movement of the plate 72. For retaining the plate 72 in sliding contact with the undersurface of the depressed portions 50, a fastening member 76 extends through the plate member 72 and is slidably received within a slot 78 whereby the fasteners 76 retain the plate 72 against the undersurface of the depressed portion 50. At one end of the plate 72 is provided a depending lug 80 which is internally screw threaded for receiving an externally screw threaded portion 82 of an elongated actuating member 84.

Projecting outwardly from the side wall 32 of the receptacle is a supporting bracket 86 having a pair of projecting guide members 88 on the upper surface thereof for slidably receiving a rack member 90 having a longitudinal bore 92 therethrough which rotatably receives the actuating rod 84. A pair of collars 92 are secured on the rod 84 for engaging opposite ends of the rack member 90 for retaining the rod 84 and the rack 90 in adjusted position. The outer free end of the rod 84 is provided with a polygonal portion 94 for receiving a suitable tool in the nature of a wrench wherein the rod 84 may be rotated for adjusting the position of the plate 72 since the screw threaded portion 82 of the rod 84 is in screw threaded engagement with the depending lug 80 attached to the plate 72. In this manner, it will be seen that the initial position of the plates 72 may be easily adjusted whereby the relative positions of the plates 72 and the depressed portions 50 in each of the compartments 36, 38 and 40 may be adjusted or set in the desired position.

Upstanding from one side of the supporting bracket is a bearing member 96 journaling an elongated rotatable shaft 98 therein. The shaft 98 is provided with a plurality of spaced pinion gears 100 having projecting teeth 102 thereon in meshing engagement with the teeth 104 on the upper surface of the rack 90 wherein rotation of the shaft 98 will cause reciprocating movement of the rack 90 whereby all of the racks 90 will be simultaneously moved and all of the plates 72 will be simultaneously moved for simultaneously controlling the flow or discharge from the individual compartments. An offset handle 106 is provided on one end of the operating shaft 98 for actuation thereof. It will be understood that the shaft 98 will simultaneously move all of the plates 72, but it also will be understood that the initial position of the plates 72 may be adjusted by rotating the actuating rod 84 thereby giving an accurate and positive adjustment of the alignment of the openings 64 and 74 thereby forming an extremely accurate control for the quantity and relative proportions of the various materials positioned in the compartments 36, 38 and 40.

For receiving the material discharged from the individual compartments 36, 38 and 40, an elongated endless belt conveyor 108 is provided under the receptacle 12 running forwardly and rearwardly in relation thereto. The endless conveyor 108 is positioned in surrounding relation to end rollers 110 and also passes over central idler rollers 112. The forward end roller 110 is journaled on an axle 114 that is journaled in bearing blocks 116 that are slidably retained between horizontal guide members 118 for movement thereof for tensioning the endless belt conveyor 108. A screw threaded member 120 is connected to the bearing block 116, and the screw threaded member is in threaded engagement in an upstanding lug 122 and the screw threaded member 120 is provided with a hand wheel 124 at the outer end thereof wherein the bearing block 116 and the axle 114 may be longitudinally adjusted at each side of the receptacle 12 thereby varying the tension on the endless belt conveyor 108.

As illustrated in Figure 4, an elongated power take-off shaft 126 is provided which extends alongside the frame 14 which drives a transverse shaft 128 through a suitable bevel gear arrangement. A sprocket gear 130 is mounted on the shaft 128 in alignment with a sprocket gear 132 on a transverse idler shaft 134. A sprocket chain 136 surrounds the sprocket gears 130 and 132 for driving the transverse shaft 134. A similar sprocket gear 138 is mounted on the idler shaft 134 which is in alignment wtih the sprocket gear 140 on the axle 142 supporting the rear end roller 110. An endless sprocket chain 144 surrounds the sprocket gears 138 and 140 for transmitting rotary force to the roller 110 at the rear of the container 12, thereby driving the endless conveyor belt 108. Also illustrated in Figure 4 is the connection between the connecting rod 70 which is attached to the operating member 68 wherein the connecting rod 70 is secured to the sprocket gear 132 adjacent the periphery thereof wherein rotation of the sprocket gear 132 will reciprocate the actuating member 68 for oscillating the shafts 56. Therefore, it will be seen that the conveyor 108 will be simultaneously driven at the same time the agitating means 56 is driven. Accordingly, it will be now seen that the material is transported from the compartments 36, 38 and 40 to the rear of the container 12. Also, it will be noted that an enclosing bottom member 146 extends under the return run of the conveyor 108 and terminates in a downwardly extending funnel-like portion 148 at the rear end thereof for a purpose described hereinafter.

Disposed at the bottom of the rear of the receptacle 12 is a transversely extending spreading means generally designated by the numeral 150 and which includes a transversely extending casing or housing 152 that is generally oval-shaped in cross-section and which includes an upper compartment 154 and a lower compartment 156. The upper compartment is generally in communication with the depending funnel-like portion 148 wherein the fertilizer material is discharged from the conveyor belt 108 into the upper compartment 154. Rotatably disposed in the upper compartment 154 of the housing 152 is a screw auger 158 which forms a conveyor for conveying the fertilizer from the rear of the receptacle 12 outwardly into each side of the vehicle 24, thereby spreading the fertilizer over a relatively large area. Pivotally journaled in the lower compartment 156 is an elongated shaft 160 having a plurality of U-shaped projecting members 162 extending radially therefrom. The lower compartment 156 is provided with a plurality of chutes or openings 164 which receive the agitators 162. The openings 164 extend into the interior of the upper compartment 154 by the provision of openings 156. Therefore, it will be seen that the agitators 162 assure that the fertilizer material will be discharged through each of the chutes or openings 164 so that an equal amount of fertilizer will be distributed throughout the entire length of the transverse spreading conveyor means 150. As illustrated in Figure 1, a flexible section 168 is provided in the casing 152 and the screw auger 158 as well as the shaft 160 is provided with universal joints (the details of which are not illustrated) for permitting the outer end sections 170 of the casing or housing 152 to be pivoted upwardly alongside the side edges or side walls of the container 12 substantially as illustrated in Figure 1. Flexible chain members 172 normally support the end sections 170 of the housing 152, and latch means 174 may be utilized for retaining the end sections 170 in vertical position so that the vehicle 24 may be driven through relatively narrow openings in enclosures, such as fences or the like.

For oscillating the shaft 160 having the agitators 162 thereon, an offset link 176 is attached thereto and projects through the casing or housing 152. The offset link 176 is provided with an elongated slot 178 in the outer end thereof for slidably and pivotally receiving one end of a connecting rod 180 that is secured to the gear 132 at the same point as the connecting rod 70 whereby the connecting rod 180 will transmit the rotational motion of the sprocket gear 132 to oscillatory rotational motion of the shaft 160, thereby causing oscillation of the U-shaped agitators 162 about an arc substantially equal to the arc of the U-shaped agitators 60 on the shafts 56. For driving the auger 158, a gear 182 is secured thereto in alignment with a gear 184 on the transverse shaft 128 and an encircling sprocket chain 186 encircles the sprocket gears 182 and 184 for driving the auger 158. A suitable shield may be provided over the sprocket gear 182 for retaining the sprocket gear in relatively clean condition. Also, apertures 188 are provided in the housing 152 to permit passage of the chain 186. Also, it is noted that the transverse shaft 128 is mounted on suitable brackets 196 secured to the frame 14 of a vehicle 24.

While the specific details of the universal joint in the auger 158 and the shaft 160 are not illustrated, it will be understood that any suitable construction may be utilized since the outer sections 170 will be generally aligned with the inner section of the housing 152 during the spreading operation of the fertilizer from the receptacle 12. Also, a lifting winch may be provided adjacent the upper end of the receptacle 12 for raising and lowering the outer sections 170 of the casing 152, thereby greatly facilitating this operation. While the details of the winch are not illustrated, it will be understood that any type of winch may be utilized for performing this function. Also, a swingable boom may be provided on each side of the receptacle 12 for providing adequate support adjacent the outer ends of the outer sections 170 of the casing 152. Also, the boom may be utilized in conjunction with the suitable winch, as set forth above.

In operation, the fertilizer spreading device of the present invention is normally used for positioning of the usual elements found in fertilizer, such as nitrogen, phosphate and potash in the individual compartments 36, 38 and 40. By controlling the outlet of each of the compartments by the individual adjusting means whereby in the adjustment may be changed by rotating the shaft 84, it will be possible to accurately proportion the quantity of each of the above elements depending upon the desired percentage of each of the elements for spreading upon the particular area of soil. The control lever 106 may then be utilized for simultaneous control of all of the compartment dispensing mechanisms, but it will be understood that the relative proportions of the individual compartments may be individually adjustable. The conveyor 108 carries the fertilizer material discharged from the individual compartments rearwardly and discharges the same into the transversely extending conveyor or spreading means 150 wherein the material is discharged equally through the apertures or chutes 164 in the casing 152, thereby spreading the mixed elements of the fertilizer equally on the soil as the vehicle 24 moves forwardly in the normal driven manner.

If desirable, a control means may be provided on the casing 152 in order to control the discharge of the fertilizer therefrom at a rate which is equal to the rate of discharge of the material from the compartment, thereby assuring that an equal amount of fertilizer will be discharged at each chute 164. Since the casing 152 is open at the outer end thereof, even if one of the chutes 164 becomes temporarily clogged, it will be seen that a small amount of fertilizer is dispensed out of the end of the auger thereby preventing excessive clogging of the fertilizer within the auger.

The foregoing is considered as illustrative only of the principles of the invention, and further, since numerous modifications and changes will readily occur to those skilled in the art, it is not desired to limit the invention to the exact construction and operation shown and described, and accordingly, all suitable modifications and equivalents may be resorted to, falling within the scope of the appended claim.

What is claimed as new is as follows:

A fertilizer spreading machine comprising a vehicle including a mobile frame, a longitudinally elongated receptacle mounted on said frame, a plurality of transverse parallel partitions extending between the side walls of the receptacle thereby providing a plurality of compartments in side by side relation and disposed longitudinally in relation to the frame, each compartment having a bottom wall with a plurality of transversely aligned and spaced openings for discharging material from the compartments throughout the width thereof, a sliding plate mounted on the undersurface of the bottom of each compartment, each plate having a plurality of spaced and aligned apertures for registry with and misalignment with the openings in the bottom wall thereby controlling discharge of materials from the compartments, each of said plates having an actuating rod connected to one end thereof with all of said rods extending laterally of one side of the receptacle, an elongated shaft mounted on said receptacle adjacent said rods and connected therewith for simultaneously moving all of the plates, and means adjustably interconnecting each of the rods with the corresponding plate for adjusting the effective length of the rods thereby independently adjusting the degree of alignment of the apertures in the plate with the openings in the bottom of the compartment for varying the ratio of material discharged from each compartment when the plates are moved to an open position, an elongated endless belt conveyor mounted longitudinally on the frame in underlying relation to the receptacle for receiving material from each of the compartments substantially throughout the width thereof, drive means supported from the frame and connected with the conveyor for moving the conveyor belt whereby the material from the compartments will be disposed in superposed layers on the conveyor belt, an agitator shaft in each compartment journaled on the side walls of the receptacle with one end of each shaft extending exteriorly of the receptacle, each agitator shaft being disposed adjacent to and overlying the openings in the compartment, each of said agitator shafts having a plurality of longitudinally spaced projections thereon, an offset arm on the extending end of each agitator shaft, an elongated operating rod disposed alongside the receptacle and connected to and supported by said offset arms, and drive means on the frame and connected to said operating rod for reciprocating the rod and simultaneously oscillating each agitator shaft for agitating the material in the compartments.

References Cited in the file of this patent

UNITED STATES PATENTS

| | | |
|---|---|---|
| 374,455 | Crane | Dec. 6, 1887 |
| 757,813 | Kinney | Apr. 19, 1904 |
| 1,062,997 | Stanish | May 27, 1913 |
| 1,554,486 | Bell | Sept. 22, 1925 |
| 1,623,743 | McGuiness | Apr. 5, 1927 |
| 1,921,959 | Warren | Aug. 8, 1933 |
| 2,079,061 | Zuckerman | May 4, 1937 |
| 2,275,799 | Oklejas | Mar. 10, 1942 |
| 2,500,681 | Hoffstetter | Mar. 14, 1950 |
| 2,589,988 | Bruno | Mar. 18, 1952 |
| 2,626,729 | Ajero | Jan. 27, 1953 |

FOREIGN PATENTS

| | | |
|---|---|---|
| 12,815 | Great Britain | of 1888 |